(12) United States Patent
Nakamura et al.

(10) Patent No.: US 10,337,567 B2
(45) Date of Patent: Jul. 2, 2019

(54) DRIVING FORCE TRANSMISSION APPARATUS

(71) Applicant: JTEKT CORPORATION, Osaka-shi (JP)

(72) Inventors: Yasufumi Nakamura, Anjo (JP); Shin Komatsu, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 15 days.

(21) Appl. No.: 15/626,409

(22) Filed: Jun. 19, 2017

(65) Prior Publication Data

US 2017/0370425 A1 Dec. 28, 2017

(30) Foreign Application Priority Data

Jun. 23, 2016 (JP) .................................. 2016-124678

(51) Int. Cl.
| | |
|---|---|
| *F16H 57/04* | (2010.01) |
| *F16D 13/74* | (2006.01) |
| *F16D 13/64* | (2006.01) |
| *F16D 13/52* | (2006.01) |
| *F16H 48/08* | (2006.01) |
| *F16H 48/22* | (2006.01) |

(52) U.S. Cl.
CPC .............. *F16D 13/74* (2013.01); *F16D 13/52* (2013.01); *F16H 48/08* (2013.01); *F16H 48/22* (2013.01); *F16H 57/0473* (2013.01)

(58) Field of Classification Search
CPC .......... F16D 13/74; F16D 13/72; F16D 13/52; F16D 13/64; F16H 48/08; F16H 48/22; F16H 57/0473
See application file for complete search history.

(56) References Cited

U.S. PATENT DOCUMENTS

| | | | |
|---|---|---|---|
| 2014/0251083 A1 | 9/2014 | Suzuki et al. | |
| 2017/0009817 A1* | 1/2017 | Ohno | ...................... F16D 13/74 |
| 2017/0089403 A1* | 3/2017 | Ohno | ...................... B60K 17/02 |

FOREIGN PATENT DOCUMENTS

JP 2013-100079 5/2013

* cited by examiner

*Primary Examiner* — Jacob S. Scott
*Assistant Examiner* — Lillian T Nguyen
(74) *Attorney, Agent, or Firm* — Oblon, McClelland, Maier & Neustadt, L.L.P.

(57) ABSTRACT

An apparatus case of a driving force transmission apparatus includes a first case member having an accommodating chamber that accommodates a clutch mechanism including a friction clutch, a second case member combined with the first case member to form a storage chamber that stores lubricating oil, and a partition wall member that partitions the accommodating chamber and the storage chamber from each other. The partition wall member is retained by being sandwiched between the first case member and the second case member.

3 Claims, 6 Drawing Sheets

DRIVING FORCE TRANSMISSION APPARATUS

INCORPORATION BY REFERENCE

The disclosure of Japanese Patent Application No. 2016-124678 filed on Jun. 23, 2016 including the specification, drawings and abstract, is incorporated herein by reference in its entirety.

BACKGROUND OF THE INVENTION

1. Field of the Invention

The present invention relates to a driving force transmission apparatus configured to transmit a driving force of a drive source of a vehicle in a disconnectable manner.

2. Description of the Related Art

Hitherto, a driving force transmission apparatus configured to transmit a driving force of a drive source of a vehicle in a disconnectable manner by a friction clutch is used in, for example, a driving force transmission system for auxiliary driving wheels of a four-wheel drive vehicle. In this driving force transmission apparatus, when the vehicle travels in a two-wheel drive mode in which the driving force is not transmitted to the auxiliary driving wheels, drag torque generated due to a resistance of the viscosity of lubricating oil for reducing wear of clutch plates may affect fuel efficiency. In view of this, the applicant of the present invention proposes a driving force transmission apparatus described in Japanese Patent Application Publication No. 2013-100079 (JP 2013-100079 A).

The driving force transmission apparatus described in JP 2013-100079 A includes a first rotational member having a tubular portion, a second rotational member that is partially accommodated in the tubular portion of the first rotational member and is rotatable relative to the first rotational member, a friction clutch (main clutch) that is arranged between the first rotational member and the second rotational member and includes a plurality of clutch plates, and an apparatus case having an accommodating chamber that accommodates the first and second rotational members together with the friction clutch. Lubricating oil is sealed in the apparatus case. The lubricating oil lubricates a frictional slide of the clutch plate. The apparatus case is provided with a tank portion that stores the lubricating oil stirred up through rotation of the first rotational member when the vehicle travels in the two-wheel drive mode.

The lubricating oil stirred up through the rotation of the first rotational member is introduced into the tank portion of the apparatus case from the accommodating chamber via an oil introduction port. The lubricating oil stored in the tank portion is discharged to the accommodating chamber from an oil discharge port provided at a lower part of the tank portion. The opening area of the oil discharge port is smaller than the opening area of the oil introduction port. Therefore, as the vehicle speed increases, the amount of lubricating oil stored in the tank portion increases and the amount of lubricating oil in the accommodating chamber decreases. Thus, a traveling resistance caused by the drag torque is reduced, which may contribute to improvement in the fuel efficiency.

The apparatus case of the driving force transmission apparatus described in JP 2013-100079 A includes a case main body provided with the accommodating chamber and the tank portion, and a lid member that closes an opening of the case main body. In the case main body, outer walls of the accommodating chamber and the tank portion and a partition wall that partitions the accommodating chamber and the tank portion from each other are formed integrally. This apparatus case requires many processing steps for manufacturing, resulting in an increase in manufacturing cost. In this respect, the driving force transmission apparatus described in JP 2013-100079 A still has room for improvement.

SUMMARY OF THE INVENTION

It is one object of the present invention to provide a driving force transmission apparatus including a pair of rotational members arranged so as to be rotatable relative to each other, a friction clutch arranged between the pair of rotational members, and an apparatus case having an accommodating chamber that accommodates the friction clutch and a storage chamber that stores lubricating oil, in which manufacturing cost can be reduced by constructing a simple apparatus case.

A driving force transmission apparatus according to one aspect of the present invention is configured to transmit a driving force of a drive source of a vehicle in a disconnectable manner.

The driving force transmission apparatus includes:

a pair of rotational members arranged so as to be coaxially rotatable relative to each other;

a friction clutch arranged between the pair of rotational members and including a plurality of clutch plates; and an apparatus case having an accommodating chamber that accommodates the friction clutch, and a storage chamber that stores lubricating oil for lubricating the friction clutch.

The apparatus case includes a first case member having the accommodating chamber, a second case member combined with the first case member to form the storage chamber, and a partition wall member that partitions the accommodating chamber and the storage chamber from each other. The apparatus case is configured so that the lubricating oil stirred up through rotation of at least one rotational member out of the pair of rotational members is introduced into the storage chamber and the lubricating oil stored in the storage chamber flows back to the accommodating chamber from a discharge port. The partition wall member is retained by being sandwiched between the first case member and the second case member.

According to the driving force transmission apparatus of the aspect described above, the manufacturing cost can be reduced by constructing a simple apparatus case.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
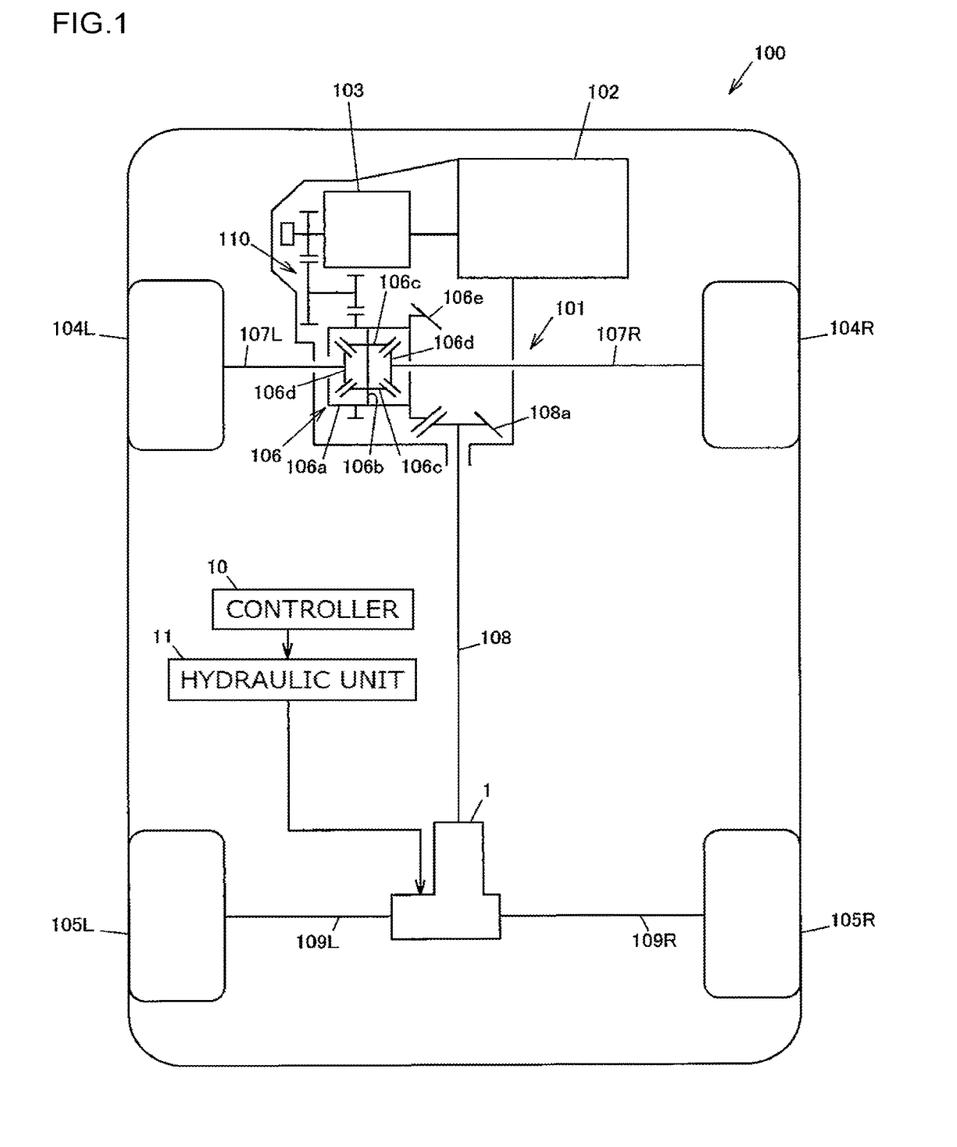
FIG. 1 is a structural view illustrating an example of the structure of a four-wheel drive vehicle on which a driving force transmission apparatus according to a first embodiment of the present invention is mounted.

A first embodiment of the present invention is described with reference to FIG. 1 to FIG. 5B. FIG. 1 is a structural view illustrating an example of the structure of a four-wheel drive vehicle on which a driving force transmission apparatus according to the first embodiment of the present invention is mounted.

A four-wheel drive vehicle 100 includes an engine 102 serving as a drive source configured to generate a driving force for traveling, a transmission 103, front wheels 104R and 104L serving as a pair of right and left main driving wheels, rear wheels 105R and 105L serving as a pair of right and left auxiliary driving wheels, a driving force transmission system 101 capable of transmitting the driving force of the engine 102 to the front wheels 104R and 104L and the rear wheels 105R and 105L, a controller 10, and a hydraulic unit 11. In this embodiment, the suffixes "R" and "L" of the reference symbols are used to represent "right" and "left" with respect to a forward traveling direction of the vehicle.

The four-wheel drive vehicle 100 is switchable between a four-wheel drive mode in which the driving force of the engine 102 is transmitted to the front wheels 104R and 104L and the rear wheels 105R and 105L and a two-wheel drive mode in which the driving force of the engine 102 is transmitted only to the front wheels 104R and 104L. In this embodiment, description is given of a case where an internal combustion engine is applied as the drive source, but the present invention is not limited thereto. The drive source may be constituted by a combination of an engine and a high-power electric motor such as an interior permanent magnet (IPM) synchronous motor, or by a high-power electric motor alone.

The driving force transmission system 101 includes a driving force transmission apparatus 1, a front differential 106, drive shafts 107R and 107L on the front wheel side, a propeller shaft 108, and drive shafts 109R and 109L on the rear wheel side. The driving force transmission apparatus 1 is arranged between the propeller shaft 108 and each of the drive shafts 109R and 109L on the rear wheel side.

The front differential 106 includes a differential case 106a, a pinion shaft 106b supported by the differential case 106a, a pair of pinion gears 106c rotatably supported by the pinion shaft 106b, and a pair of side gears 106d meshing with the pair of pinion gears 106c with their gear shafts set orthogonal to each other. The driving force output from the transmission 103 is transmitted to the differential case 106a by a gear mechanism 110.

The propeller shaft 108 has a gear portion 108a at its one end located opposite to the driving force transmission apparatus 1 (located on the front side). The gear portion 108a meshes with a ring gear 106e configured to rotate together with the differential case 106a. Thus, the driving force of the engine 102 is constantly transmitted to the propeller shaft 108 irrespective of whether the four-wheel drive vehicle 100 is in the two-wheel drive mode or the four-wheel drive mode during its traveling, and the propeller shaft 108 rotates with the driving force varied in accordance with a gear ratio between the ring gear 106e and the gear portion 108a.

The driving force distributed by the front differential 106 is transmitted to the front wheels 104R and 104L via the drive shafts 107R and 107L on the front wheel side. In the four-wheel drive mode, the driving force transmitted by the propeller shaft 108 is transmitted to the rear wheels 105R and 105L via the driving force transmission apparatus 1 and the drive shafts 109R and 109L on the rear wheel side. In the two-wheel drive mode, the transmission of the driving force from the propeller shaft 108 to the drive shafts 109R and 109L on the rear wheel side is interrupted by the driving force transmission apparatus 1.

The hydraulic unit 11 is controlled by the controller 10 to supply hydraulic oil to the driving force transmission apparatus 1. The driving force transmission apparatus 1 is actuated by a pressure of the hydraulic oil to transmit the driving force from the propeller shaft 108 to the drive shafts 109R and 109L on the rear wheel side.

Figure 2:
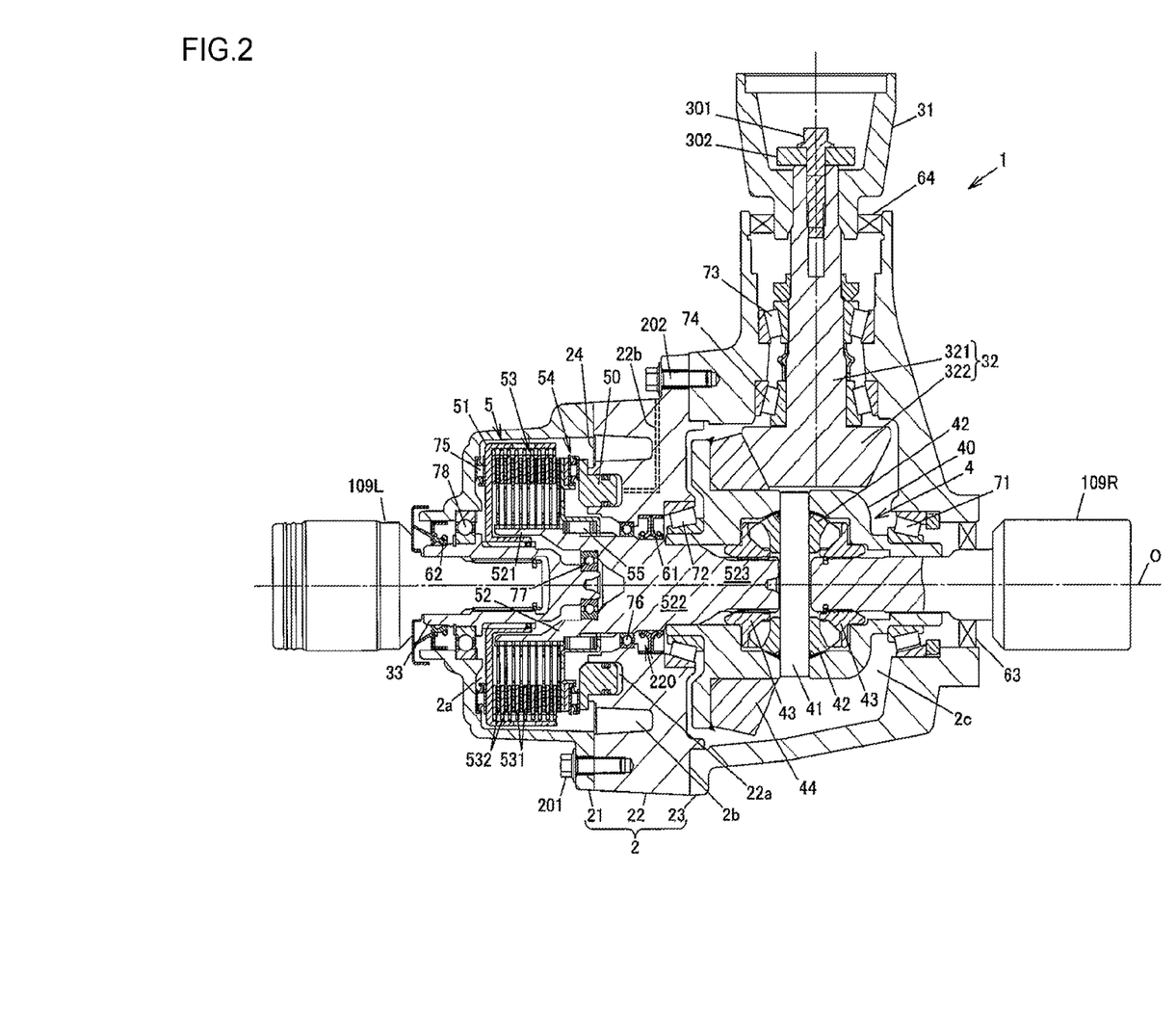
FIG. 2 is a sectional view illustrating an example of the structure of the driving force transmission apparatus in horizontal cross section.
Figure 3:
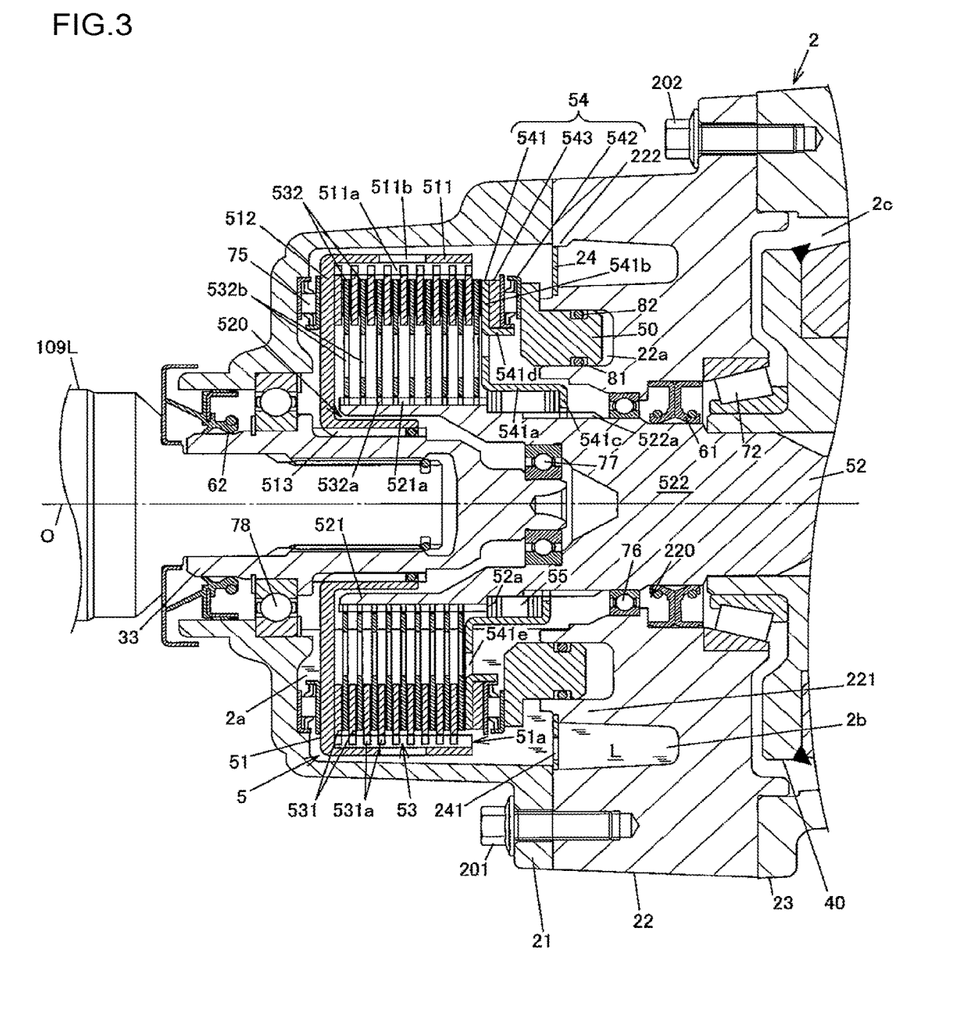
FIG. 3 is a sectional view illustrating a main part of the driving force transmission apparatus in vertical cross section.

FIG. 2 is a sectional view illustrating an example of the structure of the driving force transmission apparatus 1 in horizontal cross section. FIG. 3 is a sectional view illustrating a main part of the driving force transmission apparatus 1 in vertical cross section. In FIG. 3, the upper side of the drawing sheet corresponds to an upper side in a vertical direction in a state in which the driving force transmission apparatus 1 is mounted on the four-wheel drive vehicle 100, and the lower side of the drawing sheet corresponds to a lower side in the vertical direction in the state in which the driving force transmission apparatus 1 is mounted on the four-wheel drive vehicle 100.

The driving force transmission apparatus 1 includes an apparatus case 2 supported by a vehicle body, a coupling member 31 to which the propeller shaft 108 is coupled, a pinion gear shaft 32 configured to rotate together with the coupling member 31, a differential mechanism 4 configured to output, from a pair of side gears 43, the driving force transmitted from the pinion gear shaft 32 while allowing differential motion, a coupling shaft 33 to which the drive shaft 109L is coupled so as to rotate together, and a clutch mechanism 5 configured to regulate the driving force to be transmitted to the coupling shaft 33 from one side gear 43 out of the pair of side gears 43 of the differential mechanism 4.

The driving force transmission apparatus 1 transmits the driving force of the engine 102, which is transmitted from the propeller shaft 108, to the drive shafts 109R and 109L on the rear wheel side in a disconnectable manner while allowing differential motion. The clutch mechanism 5 is arranged between the one side gear 43 and the coupling shaft 33 in a driving force transmission path to the drive shaft 109L. When the driving force to be transmitted to the drive shaft 109L from the one side gear 43 via the coupling shaft 33 is regulated by the clutch mechanism 5 while the four-wheel drive vehicle 100 is traveling straight ahead, a driving force that is substantially equal to the driving force transmitted to the drive shaft 109L is also transmitted to the drive shaft 109R by the differential function of the differential mechanism 4.

The coupling member 31 and the pinion gear shaft 32 are coupled to each other with a bolt 301 and a washer 302. The pinion gear shaft 32 has a shaft portion 321 and a gear portion 322. The shaft portion 321 is rotatably supported by a pair of tapered roller bearings 73 and 74. The gear portion 322 meshes with a ring gear 44 of the differential mechanism 4.

The differential mechanism 4 includes a differential case 40, a pinion shaft 41 supported by the differential case 40, a pair of pinion gears 42 rotatably supported by the pinion shaft 41, the pair of side gears 43 meshing with the pair of pinion gears 42 with their gear shafts set orthogonal to each other, and the ring gear 44 configured to rotate together with the differential case 40. Both ends of the differential case 40 in a vehicle width direction are rotatably supported by tapered roller bearings 71 and 72. The coupling shaft 33 is coupled to the one side gear 43 out of the pair of side gears 43 via the clutch mechanism 5, and the drive shaft 109R is coupled to the other side gear 43 so as not to be rotatable relative to the other side gear 43. FIG. 2 illustrates outer races of constant velocity joints arranged at the ends of the drive shafts 109R and 109L on the rear wheel side.

The clutch mechanism 5 includes a piston 50 serving as a pressing member configured to operate by the pressure of the hydraulic oil supplied from the hydraulic unit 11, a tubular clutch drum 51 configured to rotate together with the coupling shaft 33, an inner shaft 52 configured to rotate together with the one side gear 43 of the pair of side gears 43 of the differential mechanism 4, a friction clutch 53 arranged between the clutch drum 51 and the inner shaft 52, and a pressing force transmission mechanism 54 configured to transmit a pressing force of the piston 50 to the friction clutch 53. The inner shaft 52 is coaxially rotatable relative to the coupling shaft 33 and the clutch drum 51. That is, the inner shaft 52, the coupling shaft 33, and the clutch drum 51 share a rotation axis O. The direction parallel to the rotation axis O is hereinafter referred to as an axial direction. The clutch drum 51 and the inner shaft 52 correspond to a pair of rotational members of the present invention.

The friction clutch 53 includes outer clutch plates 531 serving as a plurality of first clutch plates configured to rotate together with the clutch drum 51, and inner clutch plates 532 serving as a plurality of second clutch plates configured to rotate together with the inner shaft 52. A frictional slide between the outer clutch plates 531 and the inner clutch plates 532 is lubricated by lubricating oil L. In this embodiment, the friction clutch 53 includes nine outer clutch plates 531 and also nine inner clutch plates 532, and the outer clutch plates 531 and the inner clutch plates 532 are alternately arranged along the axial direction.

The friction clutch 53 generates a frictional force between the plurality of outer clutch plates 531 and the plurality of inner clutch plates 532 by receiving the pressing force of the piston 50 via the pressing force transmission mechanism 54, and transmits the driving force between the clutch drum 51 and the inner shaft 52 by the frictional force. The piston 50 has a shape of a ring about the rotation axis O.

As illustrated in FIG. 3, the pressing force transmission mechanism 54 includes a ring-shaped slide member 541 that is not rotatable relative to the inner shaft 52 and is axially coupled to the inner shaft 52, a needle roller thrust bearing 542, and a shim 543 formed into a ring shape and configured to adjust the position of the slide member 541 relative to the piston 50 by adjusting the thickness of the shim 543. The slide member 541 integrally includes a cylindrical portion 541a into which the inner shaft 52 is inserted, an outer flange portion 541b formed so as to protrude radially outward from one axial end of the cylindrical portion 541a, an inner flange portion 541c formed so as to protrude radially inward from the other axial end of the cylindrical portion 541a, and a retaining portion 541d formed so as to protrude toward the piston 50 from the outer flange portion 541b.

Ring-shaped radially inner portions of the needle roller thrust bearing 542 and the shim 543 are supported in the radial direction by the retaining portion 541d. An urging member 55 is arranged between the cylindrical portion 541a of the slide member 541 and the outer peripheral surface of the inner shaft 52. The urging member 55 is formed of an elastic body such as a spring. One axial end of the urging member 55 is brought into abutment on a stepped surface 52a formed on the inner shaft 52, and the other axial end of the urging member 55 is brought into abutment on the inner flange portion 541c of the slide member 541. The urging member 55 is arranged between the stepped surface 52a and the inner flange portion 541c while being compressed in the axial direction, and urges the slide member 541 away from the friction clutch 53 by a restoration force of the urging member 55.

The clutch drum 51 integrally includes a cylindrical portion 511 having a spline fitting portion 511a formed on its inner peripheral surface to have a plurality of spline ridges extending in the axial direction, a bottom wall portion 512 extending inward from one end of the cylindrical portion 511, and a coupling portion 513 extending along the outer peripheral surface of the coupling shaft 33 from the inner peripheral edge of the bottom wall portion 512. The clutch drum 51 has an opening 51a on the piston 50 side. The friction clutch 53 is arranged on an inner side of the cylindrical portion 511. A thrust roller bearing 75 is arranged between the bottom wall portion 512 and the inner surface of a first case member 21. The thrust roller bearing 75 restricts axial movement of the clutch drum 51. The coupling portion 513 is coupled to the coupling shaft 33 by spline fitting so as not to be rotatable relative to the coupling shaft 33.

One axial end of the inner shaft 52 is accommodated in the cylindrical portion 511 of the clutch drum 51. The inner shaft 52 integrally includes a large diameter portion 521 arranged on the inner side of the cylindrical portion 511 of the clutch drum 51, a medium diameter portion 522 having a smaller outside diameter than the large diameter portion 521, and a small diameter portion 523 coupled to the one side gear 43 so as not to be rotatable relative to the one side gear 43. The stepped surface 52a on which one end of the urging member 55 is brought into abutment is formed between the large diameter portion 521 and the medium diameter portion 522. The inner shaft 52 is inserted into a shaft hole 220 formed in a second case member 22. A ball bearing 76 is arranged between the outer peripheral surface of the medium diameter portion 522 of the inner shaft 52 and the inner peripheral surface of the shaft hole 220.

The inner shaft 52 has a first spline fitting portion 521a formed on the outer peripheral surface of the large diameter portion 521, and a second spline fitting portion 522a formed on the outer peripheral surface of the medium diameter portion 522. Both of the first spline fitting portion 521a and the second spline fitting portion 522a are formed of a plurality of spline ridges extending in the axial direction. The inner flange portion 541c of the slide member 541 is fitted to the second spline fitting portion 522a.

The outer clutch plate 531 has a plurality of protrusions 531a formed on its outer peripheral edge. The protrusions 531a engage with the spline fitting portion 511a formed on the inner peripheral surface of the cylindrical portion 511 of the clutch drum 51. Thus, the outer clutch plate 531 is coupled to the clutch drum 51 so as to be axially movable and not to be rotatable relative to the clutch drum 51. The inner clutch plate 532 has a plurality of protrusions 532a formed on its inner peripheral edge. The protrusions 532a engage with the first spline fitting portion 521a formed on the outer peripheral surface of the large diameter portion 521 of the inner shaft 52. Thus, the inner clutch plate 532 is coupled to the inner shaft 52 so as to be axially movable and not to be rotatable relative to the inner shaft 52.

A part of the inner clutch plate 532 on its outer peripheral side frictionally slides against the outer clutch plate 531. In the inner clutch plate 532, a plurality of oil holes 532b are formed at parts located on an inner side of the outer clutch plate 531. The oil holes 532b allow the lubricating oil L to flow therethrough. Further, a plurality of oil holes 541e are formed in the outer flange portion 541b of the slide member 541. The oil holes 541e allow the lubricating oil L to flow therethrough. The lubricating oil L introduced from the opening 51a of the clutch drum 51 via the oil holes 532b and 541e passes through portions between the outer clutch plates 531 and the inner clutch plates 532 by a centrifugal force, and is discharged to the outside from a plurality of discharge holes 511b formed in the cylindrical portion 511 of the clutch drum 51.

The inner shaft 52 has an accommodating hole 520 formed at its central part. The accommodating hole 520 accommodates the coupling portion 513 of the clutch drum 51 and a part of the coupling shaft 33. The accommodating hole 520 is formed over a range from the end of the inner shaft 52 on the large diameter portion 521 side to a part of the medium diameter portion 522 in the axial direction. The coupling shaft 33 is rotatably supported by a ball bearing 77 arranged between the coupling shaft 33 and the inner surface of the accommodating hole 520, and by a ball bearing 78 arranged between the coupling shaft 33 and the first case member 21.

The apparatus case 2 includes the first case member 21 having an accommodating chamber 2a that accommodates the clutch mechanism 5, the second case member 22 combined with the first case member 21 to form a storage chamber 2b that stores the lubricating oil L, a third case member 23 having an accommodating chamber 2c that accommodates the differential mechanism 4, and a partition wall member 24 that partitions the accommodating chamber 2a and the storage chamber 2b from each other. The first case member 21 and the second case member 22 are fastened to each other with a plurality of bolts 201, and the second case member 22 and the third case member 23 are fastened to each other with a plurality of bolts 202. FIG. 2 and FIG. 3 illustrate one of the plurality of bolts 201 and one of the plurality of bolts 202.

In the apparatus case 2, the accommodating chamber 2a of the first case member 21 and the accommodating chamber 2c of the third case member 23 are partitioned from each other by a seal member 61 fixed to the inner surface of the shaft hole 220 that is formed at a central part of the second case member 22. The lubricating oil L is sealed in the accommodating chamber 2a. The lubricating oil L has a viscosity suitable to lubricate the frictional slide between the plurality of outer clutch plates 531 and the plurality of inner clutch plates 532 of the friction clutch 53. Differential oil (not illustrated) is sealed in the accommodating chamber 2c of the third case member 23. The differential oil has a viscosity suitable to lubricate the gears.

In the first case member 21, a seal member 62 is fitted onto the inner surface of an insertion hole into which the coupling shaft 33 is inserted. In the third case member 23, a seal member 63 is fitted onto the inner surface of an insertion hole into which the drive shaft 109R is inserted, and a seal member 64 is fitted onto the inner surface of an insertion hole into which the coupling member 31 and the pinion gear shaft 32 are inserted.

Figure 4:
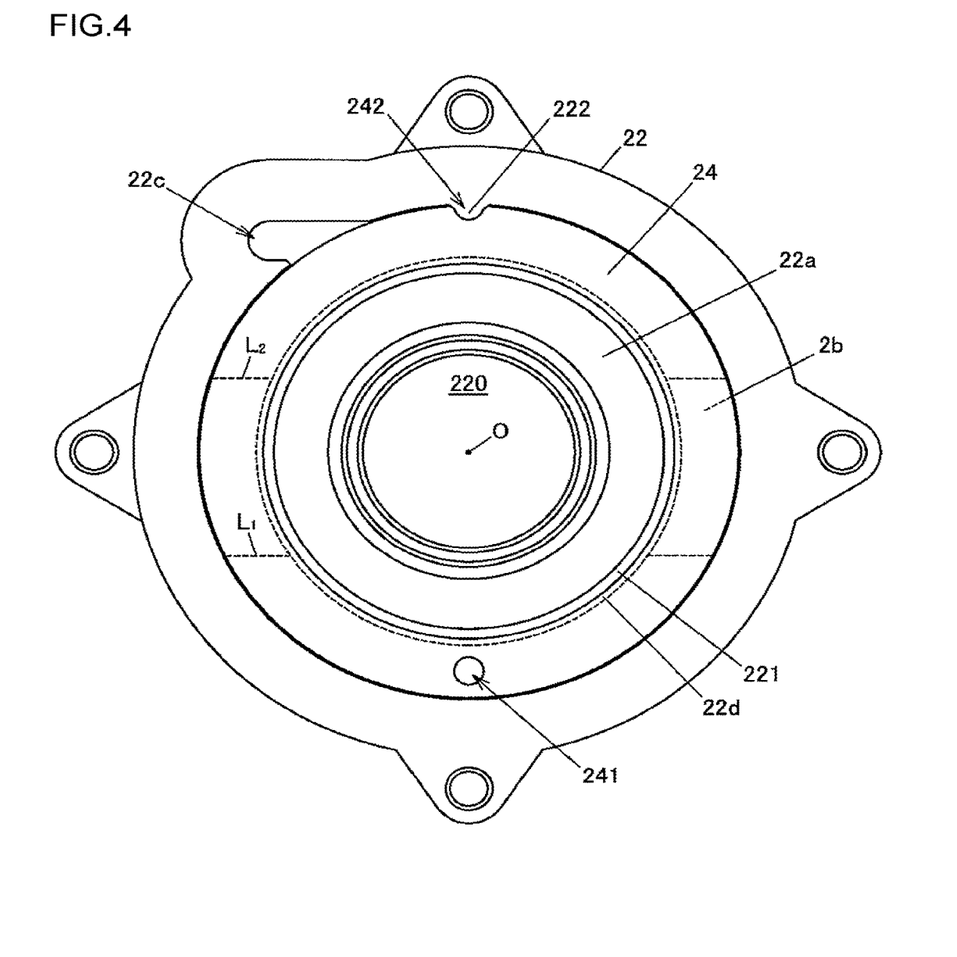
FIG. 4 is a side view of a second case member and a partition wall member that are viewed from a first case member side.

FIG. 4 is a side view of the second case member 22 and the partition wall member 24 that are viewed from the first case member 21 side. In FIG. 4, the upper side of the drawing sheet corresponds to the upper side in the vertical direction in the state in which the driving force transmission apparatus 1 is mounted on the four-wheel drive vehicle 100.

The second case member 22 is provided with a ring-shaped cylinder chamber 22a to which the hydraulic oil for moving the piston 50 toward the friction clutch 53 by applying a hydraulic pressure thereto is supplied, and a hydraulic oil supply hole 22b (see FIG. 2) through which the hydraulic oil is supplied to the cylinder chamber 22a. FIG. 2 illustrates the hydraulic oil supply hole 22b with dashed lines.

The cylinder chamber 22a and the storage chamber 2b have shapes of circular rings formed concentrically about the rotation axis O. In the second case member 22, the storage chamber 2b is formed on an outer peripheral side with respect to the cylinder chamber 22a. In the second case member 22, a cylindrical ring-shaped wall portion 221 is provided between the storage chamber 2b and the cylinder chamber 22a. Both of the cylinder chamber 22a and the storage chamber 2b are formed as recessed portions that are open to the accommodating chamber 2a of the first case member 21 and are recessed in the direction of the rotation axis O toward the third case member 23. The storage chamber 2b is closed by the ring-shaped partition wall member 24 at a part of the opening of the recessed portion.

The hydraulic oil is supplied to the cylinder chamber 22a from the hydraulic unit 11 via the hydraulic oil supply hole 22b. The piston 50 is reciprocable in the direction of the rotation axis O in a state in which a part of the piston 50 in the axial direction is arranged in the cylinder chamber 22a. The piston 50 moves toward the accommodating chamber 2a by the hydraulic pressure of the hydraulic oil supplied to the cylinder chamber 22a, thereby pressing the friction clutch 53. When the pressure of the hydraulic oil in the cylinder chamber 22a decreases, the piston 50 moves to a deeper side of the cylinder chamber 22a by the urging force of the urging member 55, which is received via the pressing force transmission mechanism 54, so that the piston 50 is brought away from the friction clutch 53. Circumferential grooves are formed on the inner peripheral surface and the outer peripheral surface of the piston 50, respectively, and O-rings 81 and 82 (illustrated in FIG. 3) are retained in the circumferential grooves. The O-rings 81 and 82 slide along the inner surfaces of the cylinder chamber 22a along with the reciprocating movement of the piston 50.

When the four-wheel drive vehicle 100 travels forward, the clutch drum 51 rotates counterclockwise in FIG. 4. In FIG. 4, reference symbol $L_1$ represents an oil level of the lubricating oil L in the storage chamber 2b when the four-wheel drive vehicle 100 is stopped and the rotation of each of the clutch drum 51 and the inner shaft 52 is stopped, and reference symbol $L_2$ represents an oil level of the lubricating oil L in the storage chamber 2b when the four-wheel drive vehicle 100 travels at a high speed (for example, 100 km/h).

The partition wall member 24 is formed of a metal sheet such as a cold rolled carbon steel sheet that is formed into a ring shape. The partition wall member 24 has a through hole 241 formed near its lower edge. The through hole 241 passes through the partition wall member 24 in its thickness direction. The through hole 241 functions as a discharge port through which the lubricating oil L stored in the storage chamber 2b is discharged to the accommodating chamber 2a. Further, the partition wall member 24 has a cutout 242 formed at its upper edge. The cutout 242 is used for preventing rotation of the partition wall member 24 in its circumferential direction. A protruding portion 222 formed on the second case member 22 engages with the cutout 242.

The second case member 22 has an introduction port 22c through which the lubricating oil L stirred up through the rotation of the clutch drum 51 is guided to the storage chamber 2b. The introduction port 22c is formed such that the opening of the storage chamber 2b projects outward over the outer edge of the partition wall member 24 at the upper edge of the storage chamber 2b. In the example illustrated in FIG. 4, the introduction port 22c projects in a horizontal direction. The first case member 21 has a cutout (not illustrated) formed at a part that faces the introduction port 22c in the axial direction.

When the lubricating oil L in the accommodating chamber 2a is stirred up through the rotation of the clutch drum 51, the stirred-up lubricating oil L is introduced into the storage chamber 2b from the introduction port 22c. The amount of the lubricating oil L to be introduced into the storage chamber 2b is larger as the rotation speed of the clutch drum 51 is higher. Further, the amount of the lubricating oil L to be discharged to the accommodating chamber 2a from the through hole 241 of the partition wall member 24 is larger as the oil level in the storage chamber 2b is higher.

Therefore, at the time of acceleration in which the vehicle speed increases, the amount of the lubricating oil L stored in the storage chamber 2b increases and the amount of the lubricating oil L in the accommodating chamber 2a decreases. At the time of deceleration, the amount of the lubricating oil L stored in the storage chamber 2b decreases and the amount of the lubricating oil L in the accommodating chamber 2a increases. Thus, the apparatus case 2 is configured so that the lubricating oil L stirred up through the rotation of the clutch drum 51 is introduced into the storage chamber 2b and the lubricating oil L stored in the storage chamber 2b flows back to the accommodating chamber 2a from the through hole 241 of the partition wall member 24.

The partition wall member 24 is retained by being sandwiched between the first case member 21 and the second case member 22. Next, a retaining structure for the partition wall member 24 is described in detail with reference to FIGS. 5A and 5B.

Figure 5A:
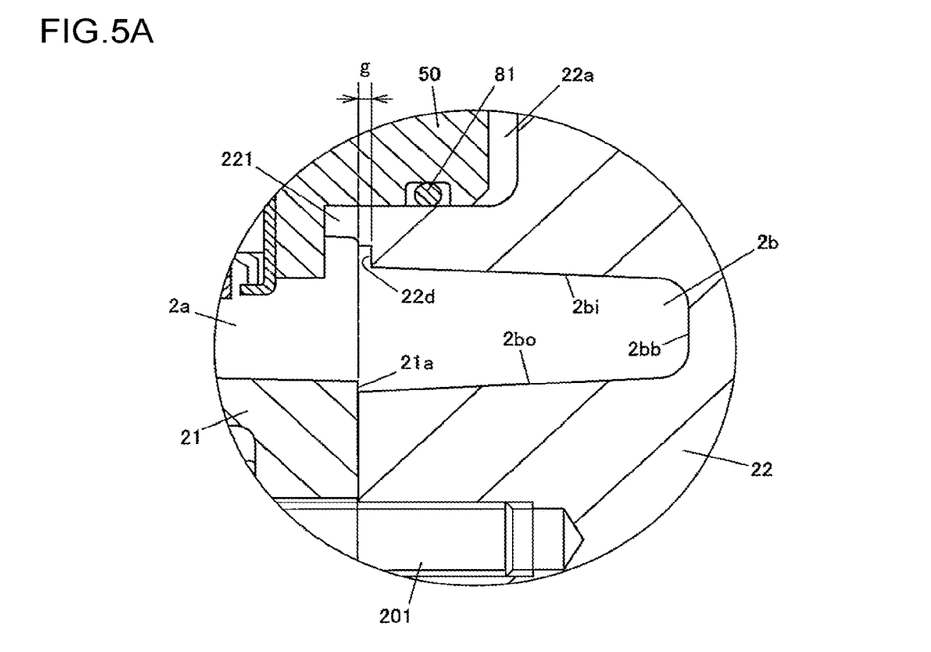
FIG. 5A is a partially enlarged view of FIG. 2 without the illustration of the partition wall member.
Figure 5B:
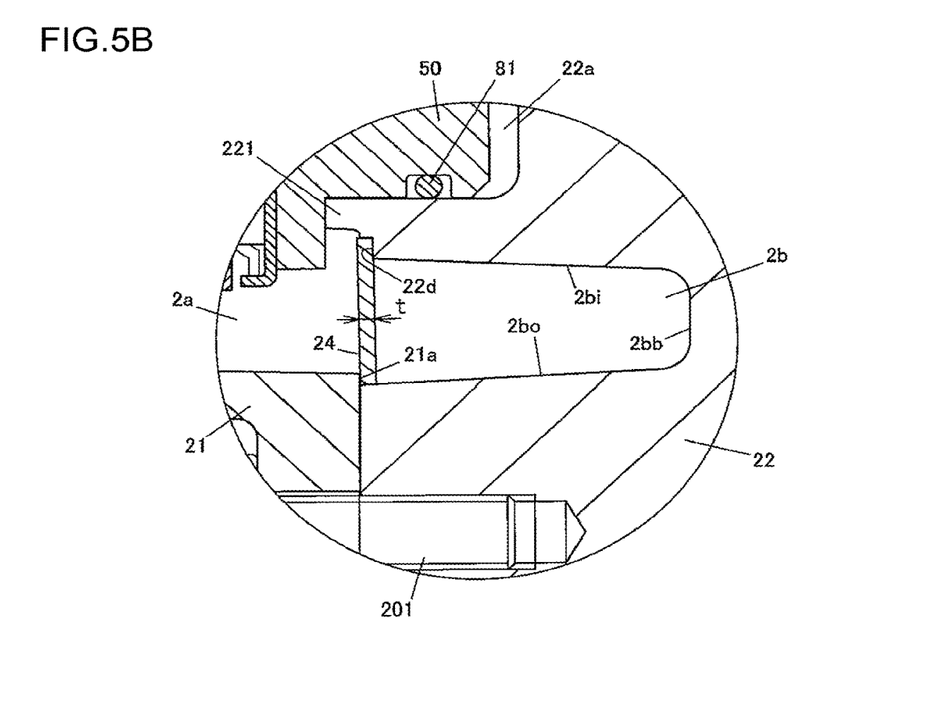
FIG. 5B is a partially enlarged view of FIG. 2 with the illustration of the partition wall member.

FIG. 5A is a partially enlarged view of FIG. 2 without the illustration of the partition wall member 24. FIG. 5B is a partially enlarged view of FIG. 2 with the illustration of the partition wall member 24.

An inner peripheral inner surface (inner surface on an inner peripheral side) 2bi, a bottom surface 2bb, and an outer peripheral inner surface (inner surface on an outer peripheral side) 2bo of the storage chamber 2b are formed on the second case member 22.

The partition wall member 24 is retained between a first abutment surface 21a formed on the first case member 21 and a second abutment surface 22d formed on the second case member 22. In this embodiment, the first abutment surface 21a is formed on an axial end face of the first case member 21, which faces the second case member 22. More specifically, a part of the axial end face of the first case member 21 on a radially inner side serves as the first abutment surface 21a. The second abutment surface 22d is formed as a stepped surface of a stepped portion having a different outside diameter on the outer peripheral surface of the ring-shaped wall portion 221 of the second case member 22. The first abutment surface 21a is a surface that is oriented toward the storage chamber 2b and is perpendicular to the axial direction, and the second abutment surface 22d is a surface that is oriented toward the accommodating chamber 2a and is perpendicular to the axial direction.

The outer peripheral edge of the partition wall member 24 is brought into abutment on the first abutment surface 21a, and the inner peripheral edge of the partition wall member 24 is brought into abutment on the second abutment surface 22d. As illustrated in FIG. 5A, a distance between the first abutment surface 21a and the second abutment surface 22d in the axial direction is represented by "g". The distance g is smaller than a thickness t of the partition wall member 24. The thickness t of the partition wall member 24 is, for example, 1.0 mm, and the distance g between the first abutment surface 21a and the second abutment surface 22d is, for example, 0.9 mm.

Through the abutment of the outer peripheral edge and the inner peripheral edge of the partition wall member 24 on the first and second abutment surfaces 21a and 22d, the partition wall member 24 is retained while being elastically deformed in the axial direction. Specifically, the outer peripheral edge of the partition wall member 24 that is brought into abutment on the first abutment surface 21a is located closer to the second case member 22 (deeper side of the storage chamber 2b in the axial direction) than the inner peripheral edge of the partition wall member 24 that is brought into abutment on the second abutment surface 22d. By a restoration force of the partition wall member 24, the outer peripheral edge is elastically pressed against the first abutment surface 21a, and the inner peripheral edge is elastically pressed against the second abutment surface 22d. This structure reduces the occurrence of a case where the lubricating oil L stored in the storage chamber 2b leaks from the inner periphery or the outer periphery of the partition wall member 24 into the accommodating chamber 2a.

According to the first embodiment described above, the accommodating chamber 2a and the storage chamber 2b are partitioned from each other by the partition wall member 24, and the partition wall member 24 is retained by being sandwiched between the first case member 21 and the second case member 22. Therefore, the manufacturing cost can be reduced by constructing the apparatus case 2 more simply as compared to, for example, a case where the partition wall member 24 is formed integrally with the first case member 21 or the second case member 22.

Further, the partition wall member 24 is retained such that the outer peripheral edge is brought into abutment on the first abutment surface 21a and the inner peripheral edge is brought into abutment on the second abutment surface 22d. Therefore, even if, for example, the distance g between the first abutment surface 21a and the second abutment surface 22d has a deviation at the time of manufacturing, the deviation is canceled out by the elastic deformation of the partition wall member 24. As a result, the partition wall member 24 can be retained securely.

Still further, the partition wall member 24 is retained while being elastically deformed in the axial direction. Therefore, the outer peripheral edge is brought into close contact with the first abutment surface 21a, and the inner peripheral edge is brought into close contact with the second abutment surface 22d. This structure securely prevents the occurrence of the case where the lubricating oil L stored in the storage chamber 2b leaks from the inner periphery or the outer periphery of the partition wall member 24 into the accommodating chamber 2a.

Next, a second embodiment of the present invention is described with reference to FIGS. 6A and 6B. A driving force transmission apparatus according to the second embodiment is different from the driving force transmission apparatus according to the first embodiment in terms of the retaining structure for the partition wall member 24, and has the other components in common with those of the first embodiment. Therefore, in FIGS. 6A and 6B, members or the like corresponding to those described in the first embodiment are represented by the same reference symbols used in FIGS. 2 to 5B to omit redundant description.

Figure 6A:
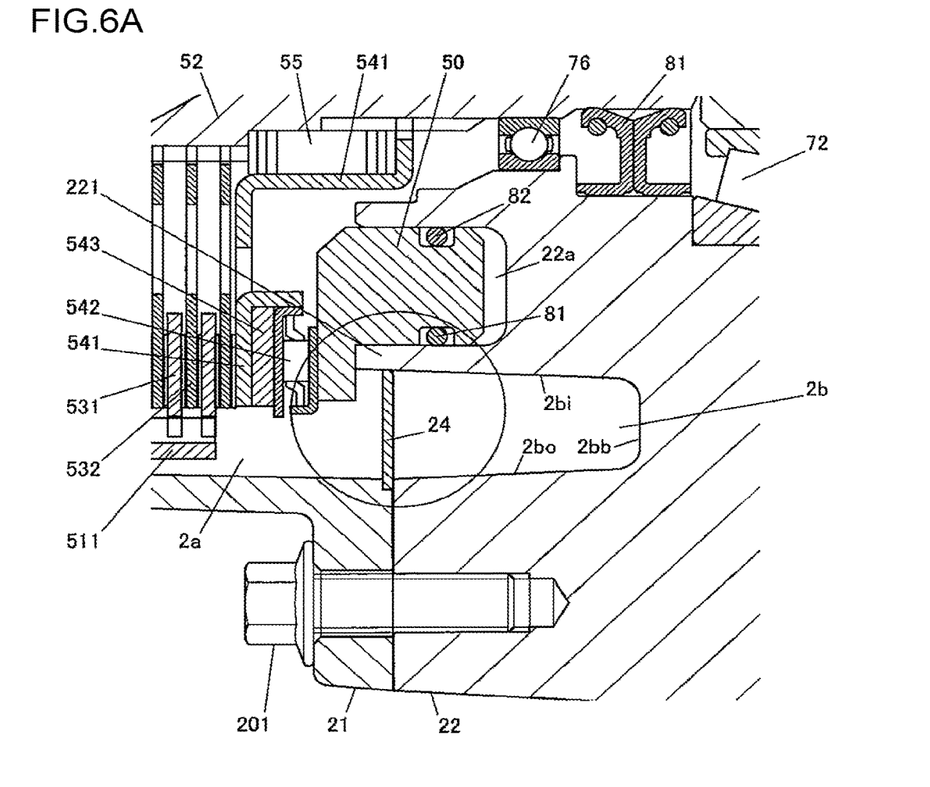
FIG. 6A is a partial sectional view of a driving force transmission apparatus according to a second embodiment of the present invention.
Figure 6B:
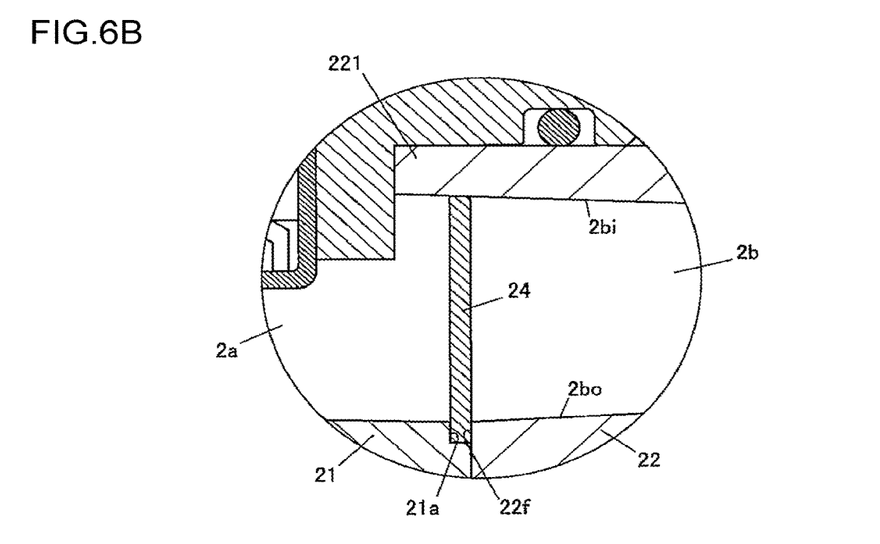
FIG. 6B is an enlarged view of a part of FIG. 6A.

FIG. 6A is a partial sectional view of the driving force transmission apparatus according to the second embodiment. FIG. 6B is an enlarged view of a part A of FIG. 6A.

In this embodiment, the inner peripheral inner surface (inner surface on the inner peripheral side) 2*bi,* the bottom surface 2*bb,* and the outer peripheral inner surface (inner surface on the outer peripheral side) 2*bo* of the storage chamber 2*b* are formed on the second case member 22. Further, in this embodiment, the outer peripheral edge of the partition wall member 24 is sandwiched between the first abutment surface 21*a* formed on the first case member 21 as a stepped surface and an axial end face 22*f* of the second case member 22. The inner peripheral edge of the partition wall member 24 is brought into contact with the inner peripheral inner surface 2*bi* of the storage chamber 2*b* (outer peripheral surface of the ring-shaped wall portion 221). A small clearance may be formed between the inner peripheral edge of the partition wall member 24 and the inner peripheral inner surface 2*bi* of the storage chamber 2*b*.

Also in this embodiment, the manufacturing cost of the apparatus case 2 can be reduced by constructing a simple apparatus case as in the first embodiment.

The present invention may be modified as appropriate without departing from the spirit of the present invention. For example, in the embodiments described above, description is given of the case where the pressing member configured to press the friction clutch 53 is the piston 50 configured to operate by the pressure of the hydraulic oil. However, the present invention is not limited to this case. For example, the friction clutch 53 may be pressed by a cam thrust force of a cam mechanism to be actuated by the output torque of an electric motor. In this case, for example, a cam member that constitutes the cam mechanism serves as the pressing member configured to press the friction clutch 53.

In the embodiments described above, description is given of the case where the lubricating oil L stirred up through the rotation of the clutch drum 51 is introduced into the storage chamber 2*b*. However, the present invention is not limited to this case. The lubricating oil L stirred up through the rotation of the inner shaft 52 may be introduced into the storage chamber 2*b*. In this case, for example, a stir-up member provided with vanes for stirring up the lubricating oil L may be fixed to the inner shaft 52 so as to rotate together with the inner shaft 52.

In the embodiments described above, description is given of the case where the clutch drum 51 rotates together with the coupling shaft 33 and the first spline fitting portion 521*a* engaging with the inner clutch plates 532 is formed on the outer peripheral surface of the inner shaft 52. However, the clutch drum 51 may be coupled to the inner shaft 52 so as to rotate together with the inner shaft 52, and a spline fitting portion engaging with the inner clutch plates 532 may be formed on the outer peripheral surface of the coupling shaft 33. In this case, the clutch drum 51 and the coupling shaft 33 correspond to the pair of rotational members of the present invention.

In the embodiments described above, description is given of the case where the driving force transmission apparatus 1 includes the differential mechanism 4. However, the present invention is not limited to this case. The driving force transmission apparatus may be constructed as a single-input and single-output apparatus configured to transmit the driving force from an input rotational member (for example, the inner shaft 52) to an output rotational member (coupling shaft 33) in a disconnectable manner. In this case, the apparatus case 2 is formed of the first case member 21 and the second case member 22.

The first case member 21 may be formed of a plurality of segments. For example, in the embodiments described above, description is given of the case where the first case member 21 is a bottomed cylindrical integrated member including a bottom on which the thrust roller bearing 75 is brought into abutment and a cylindrical portion having an inner peripheral surface facing the clutch drum 51. However, the bottom and the cylindrical portion may be formed as, for example, two segments coupled to each other with bolts. Further, the second case member 22 may be formed of a plurality of segments.

What is claimed is:

1. A driving force transmission apparatus configured to transmit a driving force of a drive source of a vehicle in a disconnectable manner, the driving force transmission apparatus comprising:

a pair of rotational members arranged so as to be coaxially rotatable relative to each other;

a friction clutch arranged between the pair of rotational members and including a plurality of clutch plates; and an apparatus case having an accommodating chamber that accommodates the friction clutch, and a storage chamber that stores lubricating oil for lubricating the friction clutch, wherein the apparatus case includes:

a first case member having the accommodating chamber;

a second case member combined with the first case member to form the storage chamber; and a partition wall member that partitions the accommodating chamber and the storage chamber from each other, the apparatus case is configured so that the lubricating oil stirred up through rotation of at least one rotational member out of the pair of rotational members is introduced into the storage chamber and the lubricating oil stored in the storage chamber flows back to the accommodating chamber from a discharge port, and the partition wall member is retained by being sandwiched between the first case member and the second case member.

2. The driving force transmission apparatus according to claim 1, wherein the partition wall member is formed of a metal sheet that is formed into a disc shape, and is retained between a first abutment surface formed on the first case member and a second abutment surface formed on the second case member, and an outer peripheral edge of the partition wall member is brought into abutment on the first abutment surface, and an inner peripheral edge of the partition wall member is brought into abutment on the second abutment surface.

3. The driving force transmission apparatus according to claim 2, wherein a distance between the first abutment surface and the second abutment surface in a direction of a rotation axis of the pair of rotational members is smaller than a thickness of the partition wall member, and the partition wall member is retained while being elastically deformed in the direction of the rotation axis through the abutment of the outer peripheral edge and the inner peripheral edge on the first abutment surface and the second abutment surface.

* * * * *